(12) United States Patent
Wittenschlaeger

(10) Patent No.: US 10,063,393 B2
(45) Date of Patent: Aug. 28, 2018

(54) DISTRIBUTED NETWORK INTERFACES FOR APPLICATION CLOAKING AND SPOOFING

(71) Applicant: Nant Holdings IP, LLC, Culver City, GA (US)

(72) Inventor: Thomas Wittenschlaeger, Flowery Branch, GA (US)

(73) Assignee: Nant Holdings IP, LLC, Culver City, CA (US)

( * ) Notice: Subject to any disclaimer, the term of this patent is extended or adjusted under 35 U.S.C. 154(b) by 949 days.

(21) Appl. No.: 14/509,904

(22) Filed: Oct. 8, 2014

(65) Prior Publication Data

US 2015/0026320 A1 Jan. 22, 2015

Related U.S. Application Data

(63) Continuation of application No. 13/024,240, filed on Feb. 9, 2011, now Pat. No. 8,868,700.

(60) Provisional application No. 61/427,759, filed on Dec. 28, 2010.

(51) Int. Cl.
| | |
|---|---|
| *G06F 15/177* | (2006.01) |
| *H04L 12/66* | (2006.01) |
| *H04L 29/06* | (2006.01) |

(52) U.S. Cl.
CPC .......... *H04L 12/66* (2013.01); *H04L 63/1416* (2013.01); *H04L 63/1441* (2013.01)

(58) Field of Classification Search
CPC .. H04L 12/66; H04L 63/1416; H04L 63/1441
USPC ........................................................ 709/221
See application file for complete search history.

(56) References Cited

U.S. PATENT DOCUMENTS

| | | | |
|---|---|---|---|
| 6,041,117 | A | 3/2000 | Androski |
| 6,993,010 | B1 | 1/2006 | Peshkin |
| 7,171,492 | B1 | 1/2007 | Borella |
| 7,293,077 | B1 | 11/2007 | Teo et al. |
| 7,548,556 | B1 | 6/2009 | Wittenschlaeger |
| 7,561,571 | B1 | 7/2009 | Lovett |
| 7,707,309 | B2 | 4/2010 | Shanbhag |
| 7,760,717 | B2 | 7/2010 | Atkinson |
| 7,761,923 | B2 | 7/2010 | Khuti |
| 2003/0069922 | A1 | 4/2003 | Arunachalam |
| 2003/0101426 | A1 | 5/2003 | Sarkinen |

(Continued)

FOREIGN PATENT DOCUMENTS

WO     02/46944     6/2006

OTHER PUBLICATIONS

Fujitsu, "Inter-cloud data security technology developed by Fujitsu", Physorg.com, Oct. 19, 2010, http://www.physorg.com/print206700421.html.

(Continued)

*Primary Examiner* — Normin Abedin
*Assistant Examiner* — Karina J Garcia-Ching
(74) *Attorney, Agent, or Firm* — Mintz Levin Cohn Ferris Glovsky and Popeo, P.C.

(57) ABSTRACT

Systems and methods associated with distributing an application's network interface over nodes of a networking fabric are presented. Nodes of the fabric can operate as interface modules, each taking on a role or responsibility for a portion of the application's network address including IP address, port assignments, or other portions of the network address. Interface modules of the networking nodes can then spoof or cloak the application to provide security against internal or external threats.

20 Claims, 4 Drawing Sheets

(56) References Cited

U.S. PATENT DOCUMENTS

| | | |
|---|---|---|
| 2003/0202520 A1 | 10/2003 | Witkowski |
| 2003/0229780 A1 | 12/2003 | Reamer |
| 2006/0156404 A1 | 7/2006 | Day |
| 2007/0091907 A1 | 4/2007 | Seshadri |
| 2007/0288896 A1 | 12/2007 | Lee |
| 2008/0235365 A1 | 9/2008 | Bansal |
| 2009/0073973 A1 | 3/2009 | Kim |
| 2009/0262741 A1 | 10/2009 | Jungck et al. |
| 2010/0040053 A1 | 2/2010 | Gottumukkula |
| 2010/0082513 A1 | 4/2010 | Liu |
| 2010/0103837 A1 | 4/2010 | Jungck |
| 2010/0211665 A1 | 8/2010 | Raza |

OTHER PUBLICATIONS

WIPO, International Search Report dated Apr. 10, 2012, International Application No. PCT/US11/66225, 1 page.

DISTRIBUTED NETWORK INTERFACES FOR APPLICATION CLOAKING AND SPOOFING

This application is a continuation of U.S. non-provisional application Ser. No. 13/024,240, filed Feb. 9, 2011, which claims the benefit of priority to U.S. provisional application Ser. No. 61/427,759, filed Dec. 28, 2010. This and all other extrinsic materials discussed herein are incorporated by reference in their entirety. Where a definition or use of a term in an incorporated reference is inconsistent or contrary to the definition of that term provided herein, the definition of that term provided herein applies and the definition of that term in the reference does not apply.

FIELD OF THE INVENTION

The field of the invention is network security technologies.

BACKGROUND

Many networks are under various sorts of threats including external attacks that put the security of the network, transported data, applications, or other networked-entities under risk. If a network becomes compromised, then applications running behind the network, or within the network, become exposed to risk. Applications can range from office productivity solutions to server-based applications, or any type of application. Examples include storage arrays, databases, printer or printing services, web services, copy or scanning machines, VOIP solutions, virtual PBX systems, cloud-based applications, search engines, or other types of applications. If any one of these applications becomes compromised, a substantial loss could be incurred.

Threats to a network can take on many different forms. One type of external threat comprises "spoofing", a technique often used by hackers. Spoofing is an intrusion technique where an attacker mimics a remote entity by replicating the remote entity's identification information (e.g., network address) so the local application considers the attacker as a valid or authorized user. Once the attacker successfully spoofs a valid or authorized entity, the attacker can cause damage to the network.

Unfortunately, applications are only as robust as the security of their network interfaces. Better security measures would include protecting applications behind the networking fabric by forming a virtual network interface for the application through which remote entities can access the application. Supplying a virtual or distributed network interface allows for isolating an application from a hostile entity, possibly by creating application-specific network interfaces.

Known efforts directed to protecting networks or applications from threats include the following references.

U.S. Pat. No. 7,561,571 to Lovett et al. titled "Fabric Address and Sub-Address Resolution in Fabric-Backplane Enterprise Servers", filed Feb. 12, 2005, describes a switch architecture capable handling IP address or a MAC address failover due to module failure.

U.S. Pat. No. 7,760,717 to Atkinson titled "Interface Switch for Use with Fibre Channel Fabrics in Storage Area Networks", filed Oct. 25, 2005, describes a switching environment where traffic address mapping between virtual and physical addresses are mediated and translated at wire speed.

U.S. Pat. No. 7,761,923 to Khuti et al. titled "Process Control Methods and Apparatus for Intrusion Detection, Protection and Network Hardening", filed Mar. 1, 2005, describes networking techniques based on stateful inspection to help protect against IP spoofing or port scanning.

U.S. patent application publication 2007/0091907 to Seshadri et al. titled "Secured Media Communication Across Enterprise Gateway", filed Oct. 2, 2006, describes establishing a communication between a media server and a client device where the media service is protected through the use of network address translation (NAT).

Unless the context dictates the contrary, all ranges set forth herein should be interpreted as being inclusive of their endpoints and open-ended ranges should be interpreted to include commercially practical values. Similarly, all lists of values should be considered as inclusive of intermediate values unless the context indicates the contrary.

Interestingly, it has yet to be appreciated that one could provide an application protection system by distributing a network interface for an application across nodes of a network fabric. When the roles and responsibilities of the application's network interface are resident in the nodes, many opportunities become available. For example, the network interface can spoof or cloak the application in a manner where a remote entity is unaware of intermediary counter measures. Upon detection of the threat, the network interface can be configured to route traffic to a monitoring location while protecting the application from the threat.

Thus, there is still a need for methods of protecting applications within or on a networking fabric.

SUMMARY OF THE INVENTION

The inventive subject matter provides apparatus, systems and methods in which one can protect networking systems by deploying a networking infrastructure capable of distributing an application's network interface across nodes in a fabric. One aspect of the inventive subject is considered to include a method of distributing a network interface. The method can include providing access to an application where remote devices or users can access the application via a networking fabric comprising communicatively coupled networking nodes, network switches for example. Example applications include storage systems, printers, cloud or grid-based applications, web servers, or other types of applications. The method can further include assigning a network address to the application. The network address can include one or more portions, which can relate to various layers of a protocol communication stack. One or more communications paths can be established through the fabric where data exchanged between the application and remote entities follow the prescribed paths. While data is being exchanged between the application and the remote entities, nodes along the communication path can be configured with an interface module that is responsive to at least a portion of the network address of the application. Packets can be exchanged through the interface module in a manner that is transparent to the remote entity.

Various objects, features, aspects and advantages of the inventive subject matter will become more apparent from the following detailed description of preferred embodiments, along with the accompanying drawing figures in which like numerals represent like components.

DETAILED DESCRIPTION

It should be noted that while the following description is drawn to networking nodes, various alternative configurations are also deemed suitable and may employ various computing devices including switches, routers, engines, controllers, adaptors, or other types of computing devices operating individually or collectively. One should appreciate the computing devices comprise a processor configured to execute software instructions stored on a tangible, non-transitory computer readable storage medium (e.g., hard drive, solid state drive, RAM, flash, ROM, etc.). The software instructions preferably configure the computing device to provide the roles, responsibilities, or other functionality as discussed below with respect to the disclosed apparatus. In especially preferred embodiments, the various nodes, switches, servers, systems, databases, or interfaces exchange data using standardized protocols or algorithms, possibly based on TCP, UDP, IP, HTTP, HTTPS, AES, public-private key exchanges, web service APIs, known financial transaction protocols, or other electronic information exchanging methods. Data exchanges preferably are conducted over a packet-switched network, LAN, WAN, VPN, or other type of packet switched network.

One should appreciate that the disclosed techniques provide many advantageous technical effects including a networking infrastructure configured to isolate threats from gaining access to an application by distributing roles or responsibilities of a network interface across nodes in a fabric.

As used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously.

Figure 1:
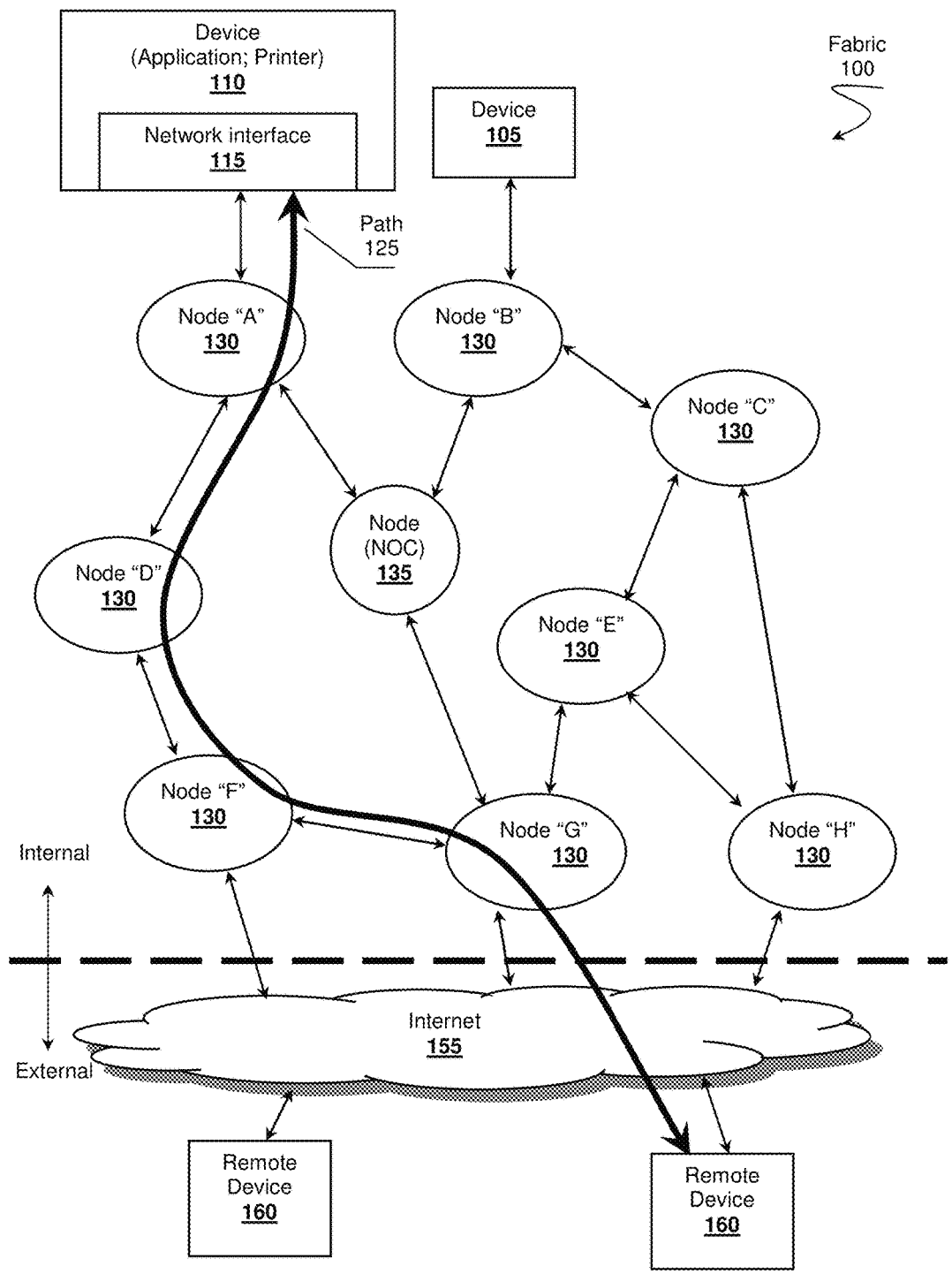
FIG. 1 is a schematic of networking fabric having a communication path through which a remote device communicates with an application considered internal to the fabric.

In FIG. 1, network fabric 100 comprises a plurality networking nodes 130. Networking nodes 130 represent computing devices configured to route data packets across the fabric (e.g., switches, routers, hubs, access points, etc.). Each node 130 can include a networking switch operating as a hybrid-fabric apparatus capable of transporting data across fabric 100 from one networking node 130 to another while also providing a infrastructure as a distributed application engine. Distributed applications can be deployed on nodes 130 of the fabric, and the executed. Each node 130 can include processors, memory, ports, or other apparatus components that can be individually assigned to data transport operations, an application's execution, or other role or responsibility. One example of a suitable switch that can be adapted for use with the disclosed techniques includes the Raptor Networks Technology™, Inc. ER-1010 switch. Another example of suitable hybrid-fabric network apparatus is described in co-pending U.S. patent application having Ser. No. 12/849,521 to Wittenschlaeger titled "Hybrid Transport—Application Network Fabric Apparatus", filed Aug. 3, 2010.

In the example shown, application 110 resides within internal network fabric 100. Application 110 is illustrated as a printer running on a suitably configured computing device (i.e., a printer). The example device also has network interface 115, through which it exchanges application data with other devices in fabric 100, nodes 130 of the fabric 100, or remote devices 160 external to the fabric, possibly separated from fabric 100 by the Internet 155. One should appreciate the printer is presented euphemistically to represent nearly any kind of application 110 running behind, in, or on fabric 100. Example applications can include storage arrays, distributed applications, productivity applications, web services, VOIP systems, virtual PBX, search engines, databases, cloud computing infrastructure, or other types of applications.

Network interface 115 can be considered hardware and software configured to manage data packet exchanges according to one or more protocols as required by application 110. One should appreciate that network interface 115 as shown represents the network interface of the application rather than merely a network interface of a device (e.g., an Ethernet port). For example, the printer's network interface could include a complete communication stack operating from the OSI physical layer up through the OSI application layer (i.e., OSI layers 1 through 7), or even higher. Although a device's physical network interface (e.g., an RJ-45 jack) can participate as a functioning element within network interface 115, the physical network interface should not be considered application 110's network interface 115.

Application data is exchanged between application 110 and remote device 160 via communication path 125 through network fabric 100. In more preferred embodiments, path 125 taken by packets is transparent to application 110 or remote device 160. Communication path 125 runs through nodes A, D, F, and G; but could just as easily follow a different path. Path 125 can also be constructed, deconstructed, changed, updated, or otherwise modified as fabric 100 dictates, even while data is exchanged between application 110 and remote device 160. For example, a link between nodes 130 could fail. In response a network fabric manager, possibly node 135 located at a network operations center (NOC) can instruct all nodes 130 to route packets or other traffic over a different path; a path through nodes A, NOC, B, C, E, and H for example. Such a rerouting or reconfiguration of a routing topology can occur quickly in a manner where application 110 and remote device 160 fail to detect a change associated with the data exchange path 125. In more preferred embodiments, reconstruction of path 125 can occur in less than an average latency between experienced between application 110 and device 160. Such a fast reconfiguration can occurred because each node 130 can store a complete mapping of all possible routes within fabric 100. If a reconfiguration event be required, all nodes 130 can simply begin redirecting traffic according to the mapping without requiring convergence on a new routes. Co-owned U.S. Pat. No. 7,352,745 titled "Switching System with Distributed Switching Fabric" and co-pending U.S. patent application Ser. No. 12/122,018 titled "Distributed Computing Bus" describe aspects of communication path reconfiguration.

An application can also take on different forms. One type of application includes a monolithic application running on a single device as in printer application 110. Other types of applications can include distributed applications having modules spread over one or more devices, possibly including network nodes 130. Regardless of the type of application, network interface 115 of application 110 can extend beyond a central device and into nodes 130 of fabric 100.

Figure 2:
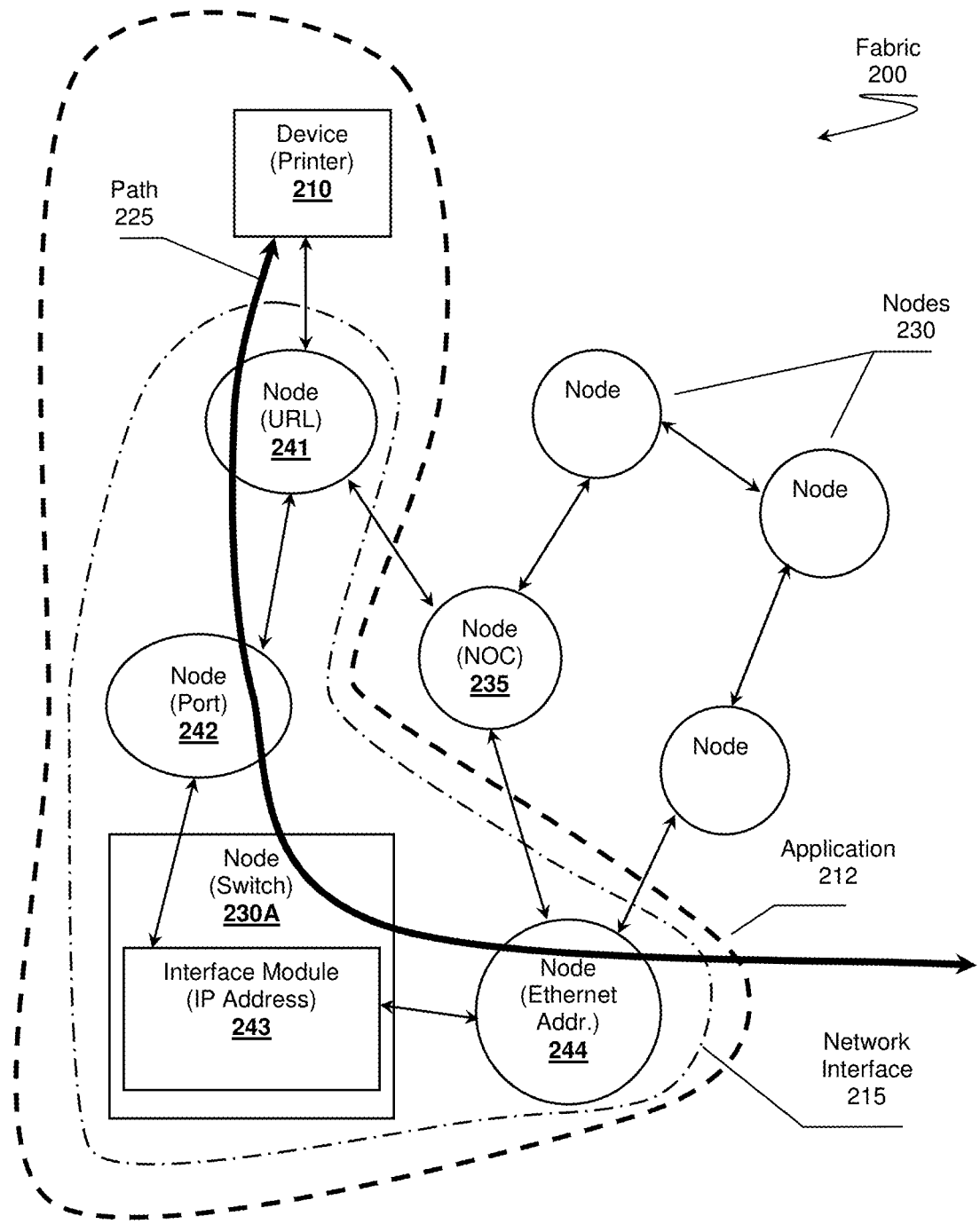
FIG. 2 is a schematic of a networking fabric where an application has a network interface distributed among nodes of the networking fabric.

In FIG. 2, application 212 has many different components. Application 212 can be considered to include device 210 represented an edge device offering a service, which communicatively couples with fabric 200 via one or more nodes 230. In the example shown, application 212 operates as a printer or printing service available to other devices within fabric 200 or possibly remote to fabric 200. The printer application's network interface 215 extends out of device 210 and has been distributed across nodes 230 of the fabric. Thus, the printer application 212 can be considered as a distributed application comprising an edge device and nodes 230 of network fabric 200. For example, one or more print queues could be stored on a networking node.

In the example shown, the printer application's network interface 215 is considered to include a communication stack distributed across nodes 230 of fabric 200 where roles or responsibilities of each layer of the stack have been placed in separate networking nodes 230. One node 230 operates as the link layer (i.e., Ethernet) of the application and has the application's MAC address. A second node operates as the networking layer (i.e., Internet Protocol) of application 212 and has the application's IP address, and so on. One should appreciate that network interface 215 can be considered an application-specific network interface dedicated to application 212. Another application, distinct from application 212, could have its own network interface distributed across nodes 230 possibly in common with network interface 215 or having no nodes in common with network interface 215.

Nodes 230 composing distributed network interface 215 of application 212 can be considered to form path 225 through the fabric, where each node 230 on path 225 comprises a interface module 243 responsive to at least a portion of the networking interface's network address. More specifically, interface module 243 on each node 230 is responsive to its node's corresponding portion of the network address. The link layer node 244 is responsive to the MAC address, the networking layer node 230A is responsive to the IP address, the transport layer node 242 is responsive to the port assignments, up through the application layer. One should appreciate that even at a highest layer; a node 241 could be responsive to URLs or even web services in a manner where the printer edge device and the distributed networking application 212 can form a printing service. The nodes can also take on roles or responsibility for other types of protocols, client side or server side, including DHCP, DNS, RTP, RTCP, TCP, UDP, SSL, SSH, RADIUS, Kerberos, ciphers, ARP, RARP, ICMP, SNMP, HTTP, SOAP, WSDL, NAT, FTP, or other protocols.

As used herein the term "responsive" is considered to include taking some form of action in response to an interface module observing a packet having a corresponding portion of the network address rather than merely passing a packet through without observation. Example actions can include reconfiguring path 225, monitoring packets, logging events, recovering lost packets, retransmitting packets, conducting handshakes, rejecting connections, or otherwise activating a response when a packet has an appropriate portion of the network address.

One should further appreciate that each node 230 can represent a network switch as in indicate with respect to node 230A, which can provide routing of data packets exchanged between application 212 and other devices. In some embodiments, the switch nodes having interface modules 243 simply route the data packets on to their destination with little more than inspecting the packets according to the switch's role in the distributed network interface. In other embodiments, the switch can respond to the packets by mimicking application 212's responses for the corresponding layer of the stack or even mimicking application 212 itself. In this sense, each node or nodes 230 can spoof or even cloak application 212. For example, a node 230 operating at the networking layer could assume the IP address of application 212 where all communication to application 212 is routed through the node responsible for being responsive to the IP address, perhaps operating as an IP address proxy. Consequently, a remote device would have the perspective that the IP address is application 212's address and would not be aware that an intervening device was monitoring communications.

Interface module 243 in each node 230 can be configured to communicate with interface modules 243 of other nodes 230. As mentioned previously where nodes comprise switches, the switches can establish very low level (i.e., physical layer), high bandwidth (e.g., greater than 10, 20, or even 30 Gbps, etc.), and low latency (e.g., less than µs) communication paths among each other. The paths can operate independent of the distributed network interface 215 infrastructure so that one node operating at a first layer can communicate with another node operating at a neighboring layer even if the two nodes are geographically separated by intervening nodes.

Fabric 200, possibly through a fabric manager, can dedicate inter-interface module communication paths among nodes 230 to facilitate their interactions. A dedicate path might include multiple hops across nodes 230, but might utilize a specific wavelength of light on optic fiber channels. In such embodiments, interface module 243 responsive to an IP address can communicate directly with another interface module 243 responsive to a TCP port or responsive to Ethernet MAC address, even when the corresponding node is considered geographically remote to the IP address interface module 243. Such an approach ensures intercommunications among interface modules do not substantially interfere with general data transport across fabric 200.

In some embodiments, interface modules 243 can comprises one or more resources dedicated to interface module 243. Example resources can include a processor core, a memory, a port, a channel, or other resources resident on a node 230. Furthermore, especially in view that communication channels among interface modules 243 can be transparent to the modules or operate as a computing bus, interface modules 243 can interact via application program interfaces (API) as if the interface modules 243 are functioning within a single computing infrastructure. For example, a TCP module call to a write ( ) API can be translated to a memory copy from the node 230 to another node 230 having an interface module responsive to an IP address.

A threat to application 212 can take on many different forms. Perhaps a denial of service attached is directed toward application 212, or an unauthorized access is attempted. The threat can be detected and the fabric can respond to the threat by reconfiguring path 225 through nodes 230. A fabric manager whose responsibility includes protecting the application can configure, even while allowing data to be exchanged by the application and the remote device, at least one of nodes 230 to operate as interface module 243 responsive to at least a portion of the application's networking address in place of a portion of the application's networking interface 215. As discussed previously, portions of the network address can include physical address, link layer address, networking address, transport address, URLs, sockets, file descriptors, domain, or other addressing elements the combine to define a communication session between networked devices.

Figure 3:
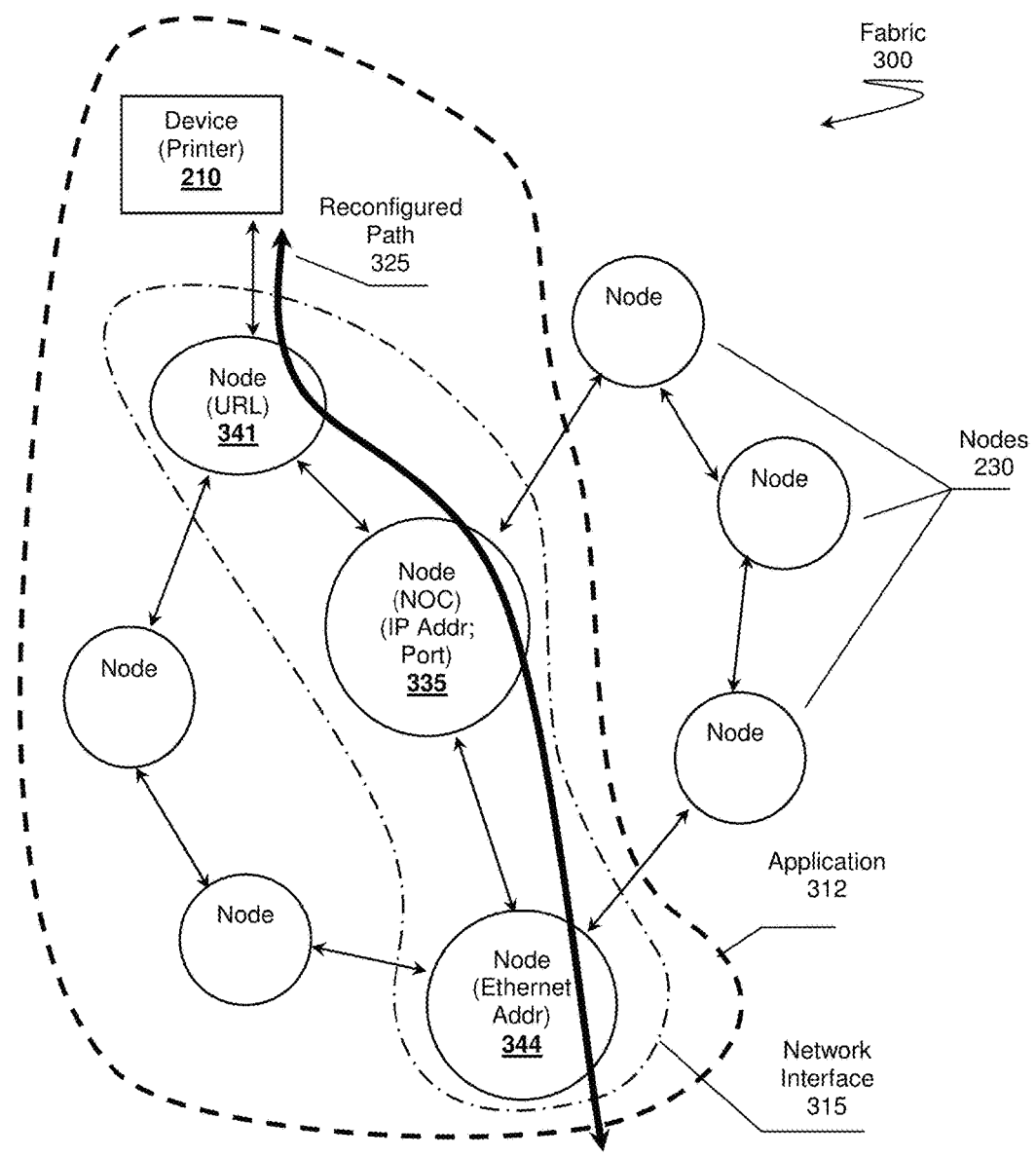
FIG. 3 is a schematic of the networking fabric from FIG. 2 where the communication path has been altered to ensure traffic passes through a monitoring station.

In FIG. 3, a threat has been detected against application 212 of FIG. 2 and a fabric manager has reconfigured distributed network interface 215 of application 212. The reconfigured network interface is presented as network interface 315 and, in view of the change to application 212, the reconfigured application is represented as application 315. In the example shown, the networking and transport layer of the application's network interface 315 has been moved to the NOC node 335. The interface module operating on NOC node 335 assumes responsibility for responding to the IP address and port portions of application 315's network address. Furthermore, the fabric manager, possibly located at NOC node 335, notifies the other nodes 230 participating within networking interface 315 of the updated low level path assignments. One should keep in mind that the paths through nodes 230 can operate independent of the path through the distributed network interface and can include port-to-port paths among the networking nodes 230.

Distributed network interface 315 can be updated or otherwise modified in real-time. More preferably distributed network interface 315 can be redistributed within an average latency time, typically within 5 µs, between application 312 and the remote device to with which application 315 exchanging data. Thus, distributed network interface 315 is reconfigured without substantially interfering with the application data exchange. Reconfiguration of the distributed network interface can occur in real-time, based on a priori defined criteria, after threat detection possibly based on a metric-based threat signature, or even on an on going periodic basis.

FIG. 3 represents a scenario where the fabric manager has decided to allow communications to continue between application 315 and a remote device. However, the threat was deemed of sufficient interest that the manager has reconfigured the distributed network interface 315 by forming or otherwise configuring NOC node 335 as an interface module responsive to the IP address and port assignments of the application. Perhaps the fabric manager as detected a threat based on IP address (e.g., denial of service) or port knocking. Data packet traffic addressed to the IP address or ports of application 312 pass through NOC node 335 for monitoring purposes. As referenced early NOC node 335, or any node 230 of the distributed network interface 315, can be geographically separated from other nodes 230 of distributed network interface 315. As packets are exchanged between application 312 and the remote device, NOC node 335 can closely monitor the packets. In addition, nodes 230 of distributed network interface 315, NOC node 335 for example, can spoof or cloak application 312 so that remote device are unaware of the actual entity taking responsibility for being responsive to portions application 312's network address.

Figure 4:
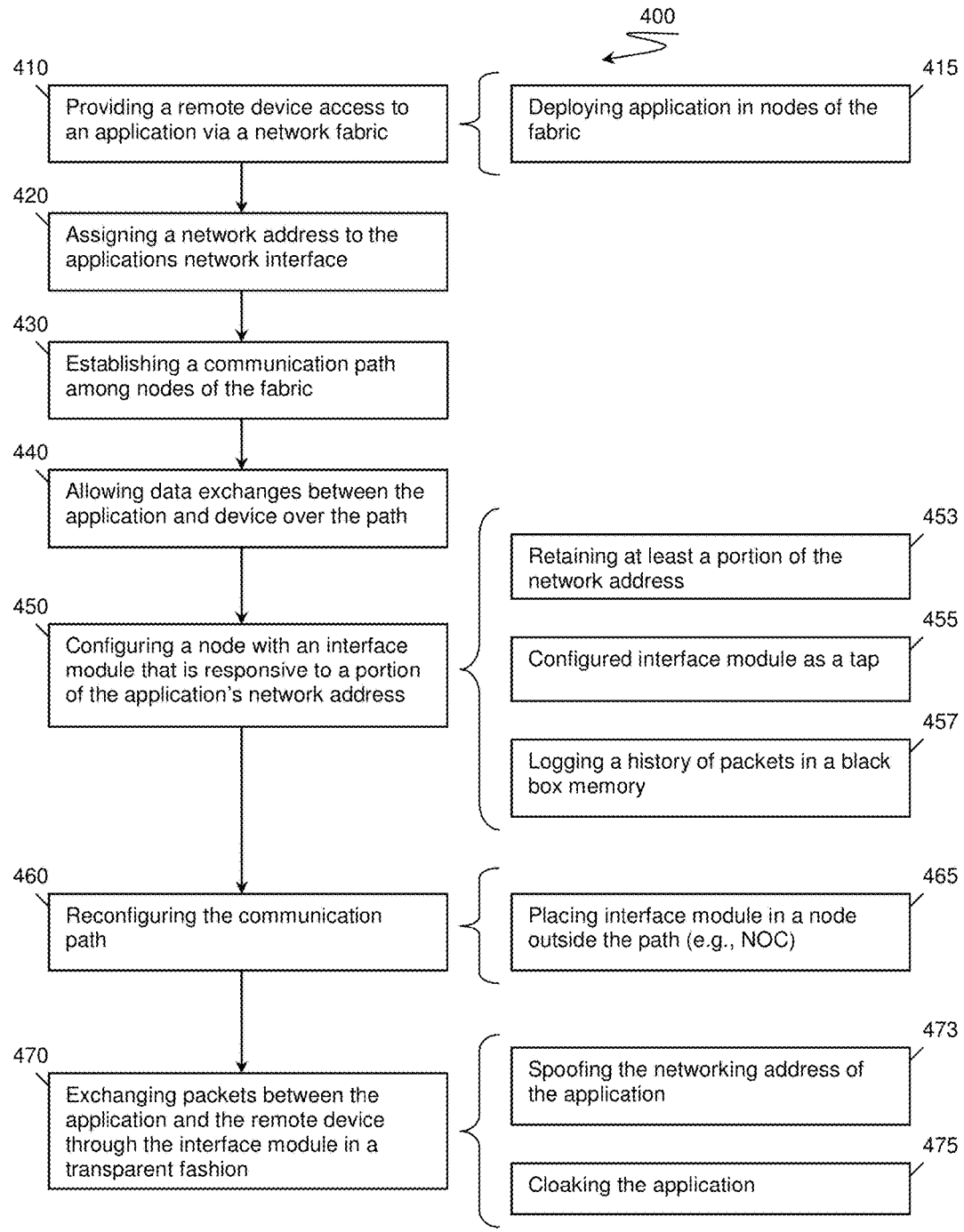
FIG. 4 is a schematic of a method for distributing a network interface.

FIG. 4 presents method 400 of distributing a network interface. Method 400 provides a more detailed outline of the disclosed inventive subject matter relating to protecting an application by spoofing or cloaking the application from external threats.

Step 410 includes providing a remote device access to an application via a network fabric comprising multiple networking nodes, preferably switches. The remote device can be located anywhere geographically relative to the application. In some embodiments, the remote device is external to the network fabric and accesses the application via an external network, the Internet for example. The remote device could also be another computing device considered internal to the network fabric. Providing access can include providing authorized access or can be considered to include simply exposing a network interface of the application to other devices, even unauthorized devices. Furthermore, step 415 can include distributing the application among nodes of the network fabric where modules of the application can be resident on different nodes (e.g., network switches). In more preferred embodiment, each node allocates one or more local resources (e.g., processor core, memory, ports, channels, storage, etc.) for use by the application or its modules.

Step 420 includes assigning a network address to the application's network interface. The network address can include more than a single identifier or can include multiple portions. For example, the network address can comprise portions that correspond to different layers of a communications stack. Portions of the network address can include MAC address, IP address, transport layer port assignments, URLs, session identifiers, or other network addressing schemes. Although a TCP/IP stack is presented for illustrative purposes, one should appreciate that a communication stack could comprise other protocols. Example communication stacks can include USB, Bluetooth, WAP, cellular stacks, or other layered communication infrastructure. Furthermore, the components of the application's network interface can be distributed among nodes of the network to form a distributed network interface where each node can be configured as an interface module responsive to portions of the network address.

Step 430 can include establishing a communication path among nodes of the fabric where the application exchanges packets with the remote device along nodes of the communication path. In more preferred embodiments, the distributed network interface is, at least partially, distributed among the nodes of the communication path. While in some scenarios there can be a one-to-one correspondence between nodes of the distributed network interface and nodes of the communication path, one should note such a configuration is not necessary. For example, the communication path could have more nodes associated with it then nodes composing the distributed network interface. Extra nodes on the communication path can be used to shuttle packets from one location to another, or from one node of the distributed network interface to another.

Step 450 can include configuring a node within the fabric with an interface module that is responsive to a portion of the application's network address. The node can be along the communication path, a node outside the communication path, or even a node selected at the time the application is launched. The interface module preferably takes on the roles or responsibilities of the corresponding layer of the portion of the network address. For example, an interface module could be constructed to be responsive to TCP port 80 (i.e., HTTP) while other nodes have interface modules handling IP addresses, UDP ports, or other portions of the application's communication stack. Each interface module of the application's network interface can also be configured to interface to other interface modules over a dedicated low level communication path within the fabric, possibly associated with a specified wavelength as a dedicated communication channel.

Step 453 contemplates that portions of the network address are retained at existing interface modules in nodes, while other portions of the network address are migrated to other locations in the network fabric. Furthermore, at step 455, an interface module can be configured to operate as a non-intrusive tap capable of monitoring or observing traffic exchanged through the interface module. The tap can also be responsive to the portion of the network address possibly by generating duplicate packets or generating other types of messages and forwarding them to a logging location. In fact, step 457 can include logging a history of packets in a black box memory. For example, logged packets or events can be sent to a secured memory located on the same node or on a remote node. The memory can include solid state memory (e.g., solid state drive, flash, etc.) and the memory can be tamper resistant possibly by adhering to a FIPS-140 standards.

Step 460 includes reconfiguring the communication path, and by extension, the distributed network interface. The path can be altered by assigning another node to the path or routing the path through a new node. One aspect of reconfiguring the communication path can include placing or otherwise configuring the new node as an interface module as suggested by Step 465. In some embodiments, the interface module is placed on a node outside the original communication path, possibly located at a NOC for monitoring, evaluation, or other type of management activity that would be considered responsive to portions of the network address. The reconfiguration of the communication path can be achieved quickly, even while allowing data exchanges over the path to continued, by notifying the networking nodes to affect an update of the distributed network interface while the application retains connectivity with the remote device.

Step 470 includes exchanging packets between the application and the remote device through the newly placed or configured interface module in a transparent fashion where at least the remote device is unaware of a change in communication paths or the distributed network interface. In some embodiments, the switch over to the newly formed distributed network interface can occur within an average latency experienced by the remote device.

Through allowing reconfiguration of a network interface and through distributing an application's network interface through networking nodes, a number of security features are realized. A step 473, the interface modules of the distributed network interface effectively spoof the application's networking address or portions of the network address. Furthermore, when additional security is desired or according to other criteria, step 475 can include cloaking the application in a manner were the remote device simply can not perceive the actual location or address of the application or its components.

The disclosed techniques can be utilized for many different purposes. One possible application can include forming a distributed firewall for the network or even as an application specific firewall. The firewall can leverage interface modules of a distributed network interface to filter unwanted traffic or allow acceptable traffic to reach the application. In some embodiments, the distributed network interface can function as a distributed NAT system.

In more preferred embodiments, the network fabric nodes comprising hybrid-fabric computation devices capable of operating as switches as well as a general purpose computation platform. Each node allows for high throughput packet switching while also executing code dedicated to an application, possibly including the application having the distributed network interface. The switches can provide an underlying communication infrastructure among the nodes via a routing topology comprising port-to-port sessions. In view that the nodes offer computational capabilities, an application of interest (e.g., printer services, storage arrays, etc.) can be distributed throughout the nodes where the nodes perform the actual services of the application or can simply mimic the services if necessary. Such an approach provides for protecting a device or service from malicious packets without raising suspicion at a remote hostile site. One should further appreciate that the remote device with which the application is exchanging data does necessarily have to be the threat. Rather other entities could be the threat while also interacting with the application.

It should be apparent to those skilled in the art that many more modifications besides those already described are possible without departing from the inventive concepts herein. The inventive subject matter, therefore, is not to be restricted except in the scope of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc.

What is claimed is:

1. A networking fabric device configured to interact with a networking fabric for facilitating communication between an application and a remote device, the networking fabric device comprising:

a network interface communicatively coupled with other networking fabric devices within the networking fabric that is configured to perform different roles within a communication stack distributed among the fabric devices, including the networking fabric device, within the networking fabric and between the application and the remote device; and a processor coupled with the network interface and programmed to:

upon receiving a first set of instructions, configure the network fabric device to perform a first set of roles associated with a first layer of the communication stack, and to communicate with a second networking fabric device operating as part of the communication stack according to the first set of roles;

upon receiving a second set of instructions, reconfigure the network fabric device to perform a second set of roles associated with a second different layer of the communication stack, and to communicate with a third networking fabric device operating as part of the communication stack according to the second set of roles; and upon receiving the first set of instructions, configure the networking fabric device as a first interface module of the application that responds to at least a first portion of the application's network address by updating incoming packets to transmit to the application through a first set of nodes within the networking fabric via the network interface in a manner where the first interface module is transparent to the remote device.

2. The networking fabric device of claim 1, wherein the first set of roles comprises transmitting, via the network interface, data packets to a first node within the networking fabric according to a first communication path to facilitate communication between the application and the remote device.

3. The networking fabric device of claim 2, wherein the second set of roles comprising transmitting, via the network interface, data packets to a second device within the networking fabric according to a second communication path to facilitate communication between an application and a remote device via the networking fabric.

4. The networking fabric device of claim 1, wherein the first set of roles comprising configuring the first interface module as an observation tap configured to monitor the exchanged packets.

5. The networking fabric device of claim 1, wherein the processor is further programmed to, upon receiving the second set of instructions, configure the first interface module of the application to update incoming packets to transmit to the application through a second set of nodes within the networking fabric via the network interface in a manner where the first interface module is transparent to the remote device.

6. The networking fabric device of claim 1, wherein the processor is further programmed to, upon receiving the second set of instructions, configure the network fabric device as a second interface module of the application to respond to a second portion of the application's network address update incoming packets to transmit to the application through a second set of nodes within the networking fabric via the network interface in a manner where the second interface module is transparent to the remote device.

7. The networking fabric device of claim 1, wherein the first set of roles comprises logging a history of the incoming packets.

8. The networking fabric device of claim 7, wherein the first set of roles comprises storing the history in a black-box memory.

9. The networking fabric device of claim 1, wherein the first set of roles comprises updating the incoming packets while retaining connectivity between the application and the remote device via the first interface module.

10. The networking fabric device of claim 1, wherein the first set of instructions is received from a fabric management module executed on another node within the networking fabric via the network interface.

11. The networking fabric device of claim 1, wherein the first set of instructions is received from a fabric management module executed on the networking fabric device.

12. The networking fabric device of claim 1, wherein the networking fabric device comprises a line card.

13. The networking fabric device of claim 1, wherein the networking fabric device comprises a networking switch.

14. The networking fabric device of claim 1, wherein the application is executed on a computing device outside of the networking fabric.

15. The networking fabric device of claim 1, wherein the application is distributed across different networking fabric devices within the networking fabric.

16. The networking fabric device of claim 1, wherein the first layer comprises at least one of a link layer, a network layer, and a transport layer.

17. The networking fabric device of claim 1, wherein the first set of roles comprises spoofing a portion of the application's network address to intercept the incoming packets destined to the application.

18. The networking fabric of claim 1, wherein the first set of roles comprises cloaking at least a portion of the application's network address.

19. A networking fabric device configured to interaction with a networking fabric for facilitating communication between an application and a remote device, the networking fabric device comprising:
a network interface communicatively coupled with other networking fabric devices within the networking fabric that is configured to perform different roles within a communication stack distributed among the fabric devices, including the networking fabric device, within the networking fabric and between the application and the remote device; and
a processor coupled with the network interface and programmed to:
upon receiving a first set of instructions, configure the network fabric device to perform a first set of roles associated with a first layer of the communication stack, and to communicate with a second networking fabric device operating as part of the communication stack according to the first set of roles, wherein the first set of roles comprises spoofing a portion of the application's network address to intercept the incoming packets destined to the application;
upon receiving a second set of instructions, reconfigure the network fabric device to perform a second set of roles associated with a second, different layer of the communication stack, and to communicate with a third networking fabric device operating as part of the communication stack according to the second set of roles; and
upon receiving the first set of instructions, configure the networking fabric device as a first interface module of the application that responds to at least a first portion of the application's network address by updating incoming packets to transmit to the application through a first set of nodes within the networking fabric via the network interface in a manner where the first interface module is transparent to the remote device.

20. A networking fabric device configured to interact with a networking fabric for facilitating communication between an application and a remote device, the networking fabric device comprising:
a network interface communicatively coupled with other networking fabric devices within the networking fabric that is configured to perform different roles within a communication stack distributed among the fabric devices, including the networking fabric device, within the networking fabric and between the application and the remote device; and
a processor coupled with the network interface and programmed to:
upon receiving a first set of instructions, configure the network fabric device to perform a first set of roles associated with a first layer of the communication stack, and to communicate with a second networking fabric device operating as part of the communication stack according to the first set of roles, wherein the first set of roles comprises cloaking a portion of the application's network address;
upon receiving a second set of instructions, reconfigure the network fabric device to perform a second set of roles associated with a second, different layer of the communication stack, and to communicate with a third networking fabric device operating as part of the communication stack according to the second set of roles; and
upon receiving the first set of instructions, configure the networking fabric device as a first interface module of the application that responds to at least a first portion of the application's network address by updating incoming packets to transmit to the application through a first set of nodes within the networking fabric via the network interface in a manner where the first interface module is transparent to the remote device.

* * * * *